Nov. 15, 1960   J. G. OSBURN   2,960,189
VIBRATION DAMPENER
Filed Nov. 19, 1956
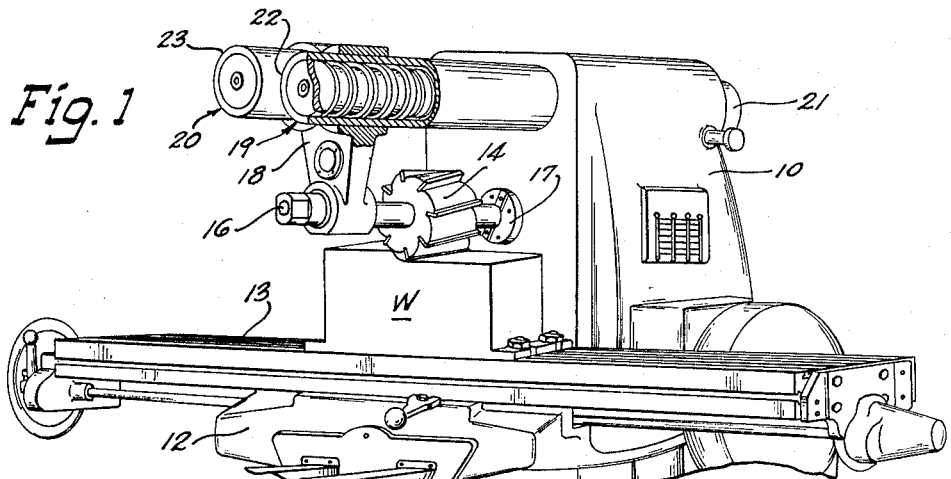
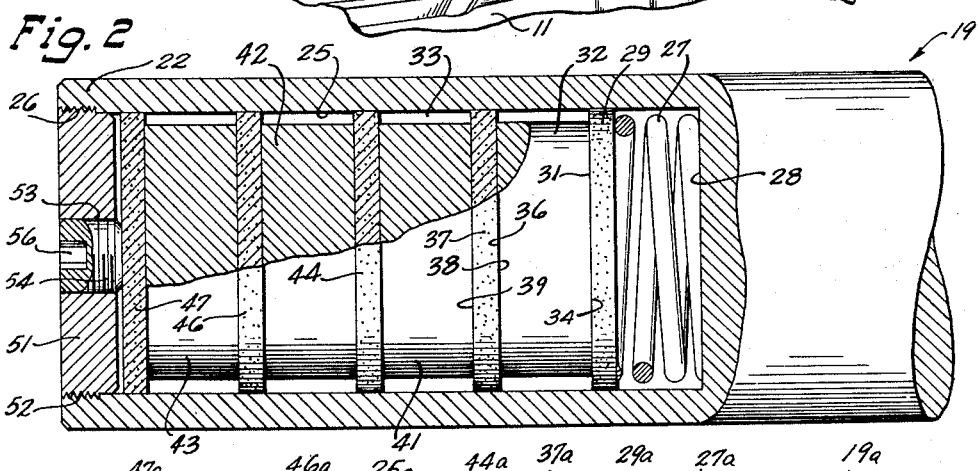
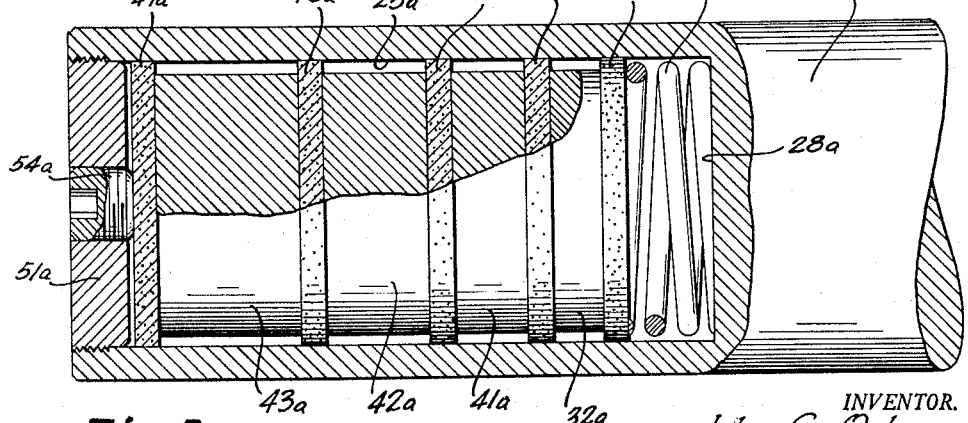
INVENTOR.
John G. Osburn
BY
Elroy J. Wutschel
Attorney United States Patent Office 2,960,189
Patented Nov. 15, 1960

2,960,189

VIBRATION DAMPENER

John G. Osburn, Milwaukee, Wis., assignor to Kearney & Trecker Corporation, West Allis, Wis., a corporation of Wisconsin Filed Nov. 19, 1956, Ser. No. 623,166

6 Claims. (Cl. 188—1)

This invention relates generally to a vibration dampening mechanism and more particularly to a vibration dampening mechanism especially adapted to attenuate the vibration of machine tool members.

Modern machine tools, designed to operate at high speeds and feeds, are particularly susceptible to the effects of vibration to the detriment of the finish obtained on the workpiece. Milling machines are particularly subject to vibrational forces which adversely affect their operation by reason of the action of the cutter operating on the workpiece. Since the cutting force varies periodically, as best indicated by the fact that at the beginning of a cut the machine may be functioning with minimum vibration, and as the cutting progresses a chatter may gradually develop until the machine is vibrating to an excessive degree, it is not practical to compensate for these forces within the machine itself. When these periodic impulses have harmonics of appreciable amplitude and correspond in frequency to the natural frequency of a member of the machine, an undesirable vibration and chattering develops which impairs the finish of the workpiece.

In machine tools vibrations are present due to the additive effect of the normal machine motion and the cutting action. This is particularly true in milling machines of the horizontal type, wherein overarms are utilized to provide the outboard support for the cutter arbor driven from the cutter spindle of the machine. It is well known that in such a milling machine the outer free end portion of the overarm shows a tendency to vibrate especially in instances where the outer end of the overarm cannot be appropriately secured to the machine, as by suitable braces. In such a case the unsecured end of the overarm may oscillate rapidly under a heavy cutting condition to such an extent as to render the machining operation unsatisfactory.

It is therefore, a general object of this invention to provide an improved vibration dampening mechanism.

Another object of this invention is to provide an improved vibration dampening mechanism which is effective over a relatively wide range of frequencies of vibration.

Another object of this invention is to provide an improved mechanism for dampening vibration and chatter due to the forces created by the opposition between a cutter and a workpiece.

Another object of this invention is to provide a structure for dissipating vibratory energy in a machine tool member in the form of heat.

Still another object of this invention is to provide an improved vibration dampener which is quickly and easily adjusted during an operation so as to increase the effectiveness of the dampener over a relatively wide frequency range.

Other objects and advantages of the present invention will be more readily apparent by reference to the following specification, considered in conjunction with the accompanying drawings forming a part thereof.

According to this invention the improved vibration dampener comprises a plurality of inertia masses interspersed between a plurality of friction plates. The inertia masses and friction plates are housed within an opening of the member that is to be stabilized and are resiliently urged into a predetermined degree of frictional engagement to provide for sliding movement of the faces of the friction plates over the faces of the inertia masses. The friction created by the relative movement between the inertia masses and the plates serves to dissipate the vibratory energy of the member in the form of heat.

For illustrative purposes, this invention is shown as being incorporated into the overarms of a typical horizontal type milling machine. It is understood that the various features of the invention may be incorporated in and utilized to advantage in other members of the depicted machine or in members of different structures.

Figure 1 is a fragmentary perspective view of the upper portion of a horizontal milling machine showing the present invention incorporated in the overarms of the machine;

Fig. 2 is an enlarged fragmentary view in vertical section depicting one of the overarms, shown in Fig. 1, with the invention applied thereto; and, Fig. 3 is a fragmentary view in vertical section, depicting the overarm shown in Fig. 2 but incorporating a modified form of the invention.

Referring more specifically to the drawing and particularly to Fig. 1 thereof, the milling machine there shown is a typical horizontal type milling machine having the usual upstanding column 10 and a knee structure 11 that carries a saddle 12 on which a work supporting table 13 is slidably mounted for horizontal longitudinal movement and upon which the workpiece W is secured. The table 13 may feed the workpiece W to a suitable milling cutter 14 to effect a desired operation thereupon. The cutter 14 is operably mounted on a suitable arbor 16 which is secured in a horizontally disposed cutter spindle 17 journalled in the column 10. The spindle 17 is operably connected for rotation, in a well known manner, to a spindle drive transmission mechanism (not shown) carried within the column 10. The outer extending end of the arbor 16 is supported by means of a suitable arbor support 18 carried by a pair of overarms 19 and 20. The overarms 19 and 20 have their rear portions 21 securely clamped in the upper portion of the column 10, in the usual manner.

It is apparent that the rear portions 21 of the overarms 19 and 20 are positively held against vibration by the machine column 10. However, the forward projecting portions 22 and 23 of the overarms 19 and 20, respectively, on which the arbor support 18 is secured, are unsupported and can be deflected transversely in a vibrating motion of varying frequency and amplitude. As previously mentioned, such vibration in the overarms is caused by the intermittent action of the cutting teeth of the cutter 14 operating upon the workpiece W as it is fed to the cutter by the table 13. The characteristics of the vibration of the outer portions 22 and 23 of the overarms 19 and 20, respectively, will vary according to the different types of machining operations performed. Furthermore, other factors such as the number and pitch of the teeth of the cutter employed, the rate of cutter rotation, and the type of material being worked upon will influence the vibration developed. Since the frequency of forced vibration will vary, it is necessary to provide a mechanism for absorbing and minimizing the vibration in the overarms which is effective over a relatively wide frequency range.

To this end, the overarms 19 and 20 are provided with a vibration dampening mechanism in accordance with the teachings of the present invention, which does not interfere with nor alter the functional capacities of the overarms. Since the vibration dampeners in both overarms are identical, only one will be described in detail. As shown in Fig. 2, the overarm 19 at its outer extending end 22 is provided with a longitudinal coaxial extending circular bore 25 the outer end of which is provided with an internal screw thread portion 26. A compression spring device 27 of slightly less diameter than the bore 25 is housed within the bore and seated against its base 28. While the member 27 is illustrated as a coil spring, it is to be understood that other types of resilient members may be employed for this purpose. A circular friction plate 29 having a diameter which establishes snug engagement of the periphery of the plate 29 within the bore 25 is inserted in coaxial alignment therein to bear against the spring 27. An outer face 31 of the plate 29 is provided with a friction surface. Preferably, the face 31 of the plate 29 is prepared so as to present an integral friction surface, however, a material having a high coefficient of friction may be bonded to the face of the plate if so desired. An inertia mass 32 of sufficiently smaller diameter than the bore 25 is next inserted within the cavity to bear against the friction face 31 of the plate 29. Since, the mass 32 is of smaller diameter than the bore 25, a space 33 exists which permits of radial movement of the mass 32 relative to the overarm 19. Faces 34 and 36 of the mass 32 are provided with friction surfaces, which are similar to the friction surface on the face 31 of the plate 29.

Similarly, another friction plate 37 is next inserted within the bore 25 to bear against the mass 32. The plate 37 is of the same diameter as is the plate 29 and snugly engages the periphery of the bore, and its faces 38 and 39 are provided with friction surfaces as are the mass 32 and plate 29. Likewise, a number of other inertia masses as 41, 42 and 43 are inserted within the bore 25, and are separated from each other by friction plates 44, 46 and 47, respectively. The masses 41, 42 and 43 are identical to the mass 32 with the friction plates 44, 46 and 47 being identical to the friction plate 37. As clearly shown in Fig. 2, the masses 32, 41, 42 and 43 are identical and each is in contact with a friction plate so that adjoining faces of the inertia masses and the several plates are in frictional engagement.

A circular closure cap 51 is provided with an external thread 52 in engagement with the threaded end 26 of the bore 25 to seal the bore and retain the operative elements therein while compressing the spring 27 to force the respective faces of the masses and the plates in frictional engagement with each other. The cap 51 is provided with a threaded axial opening 53 for receiving a threaded adjusting screw 54. The screw 54 is provided with a wrench receiving socket 56 by which means the screw 54 may be adjusted into any desired degree of engagement with the friction plate 47. By simply adjusting the screw 54 the degree of frictional pressure between the inertia masses and the friction plates may be varied as desired. It should be noted that the friction plates 29, 37, 44, 46 and 47 are all in coaxial alignment with the axis of the overarm 19 and are all in snug engagement within the bore 25, so that in effect they become a part of the overarm. Therefore, the friction surfaces of the plates are disposed substantially parallel to the transverse oscillatory vibrational movement of the overarm. Thus, by varying the degree of pressure exerted by the spring 27 through the adjustment of the screw 54, the frictional resistance to relative movement between the masses and the plates may be adjusted to any desired value.

In operation, the natural or normal vibration of the machine tool plus the vibration created by the operation of the cutter 14 on the workpiece W are transmitted to the overarm 19 causing it to vibrate in a direction transverse to its axis. The friction plates 29, 37, 44, 46 and 47 will move with the overarm in the same manner. However the masses 32, 41, 42 and 43, having no connection with the overarm 19, other than a frictional connection through contact with the associated friction plates, will tend to remain at rest. This condition exists for a portion of one-quarter of a cycle, when the masses start to move but lag behind the motion of the friction plates by virtue of their inertia and consequently move in out-of-phase relationship relative to the friction plates. Thus, relative motion between the plates and the masses occurs. With relative motion between the friction plates and the masses occurring, the energy of vibration in the overarm 19 is absorbed and converted into frictional energy which is dissipated as heat.

A modified form of the invention is illustrated in Fig. 3, incorporated in a conventional overarm of a milling machine. Fig. 3 depicts a forward portion of the overarm 19a in vertical section, having an axial bore 25a in which the various elements of the invention are mounted. A spring 27a is inserted within the bore 25a to abut a blind end 28a of the bore. A plurality of friction plates 29a, 37a, 44a, 46a and 47a are provided and inserted within the bore 25a in the identical manner as the friction plates 29, 37, 44, 46 and 47. The friction plates shown in conjunction with the structure of Fig. 2 and those shown in conjunction with the modified structure of Fig. 3 are identical in all respects. Similarly, a plurality of inertia masses 32a, 41a, 42a and 43a are interposed between the friction plates in the same manner as those of Fig. 2. However, the inertia masses of Fig. 3 vary from those of Fig. 2 in that the masses are graduated in size with the largest mass 43a being disposed in the overarm 19a at a point farthest removed from the support or column 10. The succeeding masses are progressively smaller with the smallest mass 32a being disposed closest to the fixed end of the overarm, as clearly shown in Fig. 3. Thus, the mass 43a is the largest mass and the succeeding masses are progressively smaller with the mass 32a being the smallest of the group.

The open end of the bore 25a is sealed and the elements are retained within the bore by a closure cap 51a which is threadedly engaged within the end of the bore 25a. The cap 51a is provided with a threaded adjusting screw 54a operably disposed so as to be engageable with the outer face of the friction plate 47a. It is therefore apparent that by adjusting the screw 54a any degree of pressure may be maintained between the contacting faces of the friction plates and the masses, within operable limits of the spring 27a.

An advantage of this arrangement is that the operating range of the dampener is extended. Thus, at relatively low frequencies, the mass 43a will tend to move while the masses 42a, 41a and 32a will be inoperative. As the frequency increases the remaining masses will progressively become operative until the frequency has reached a relatively high range at which time all the masses will be functioning.

It is also possible that a structure, such as the overarm 19a, may be subject to vibrations of different modes. The different modes of vibration will cause a deflection in the overarm, the form of which will vary according to the mode. That is, a first mode of vibration may cause the overarm to have maximum deflection at the unsupported end thereof. A second mode of vibration may cause a maximum deflection in the overarm to occur at a point some distance inwardly from the unsupported end of the overarm. Similarly, other modes of vibration may cause maximum deflection in the overarm to occur at other points of the overarm. For these various modes of vibration the modified form of the invention is particularly advantageous, in that the unequal or graduated masses may be inserted within the bore 25a in the inverse order from that shown. That is, the smallest mass 32a may be disposed at a point furthest from the fixed end while the largest mass 43a will be disposed closest to the fixed end of the overarm. Thus, in this order of arrangement the largest mass would be positioned at a point in the overarm wherein maximum deflection occurs due to another mode of vibration. Similarly, other variations in the order of arrangement of the unequal masses within the overarm may be made to dampen vibration due to other modes of vibration in circumstances where such vibration may occur.

It, therefore, is apparent that an improved vibration dampener or vibration energy absorber has been provided that is capable of being adjusted to respond to varied conditions that may arise during a work operation and which is simple in construction and economical to produce.

Although the illustrative embodiment of the invention has been described in conjunction with a particular element of a milling machine for the purpose of setting forth an operative and practical exemplifying structure, it is to be understood that the particular apparatus herein described is intended to be illustrative only and that the various characteristics of the invention may be incorporated in other structural forms without departing from the spirit and scope of the invention as defined in the subjoined claims.

The principles of this invention having now been fully explained in connection with the foregoing description, I hereby claim as my invention:

1. In a vibration dampener for dampening the vibration of a member; a plurality of independent masses carried by the member for independent radial movement relative to each other and to the axis of the member, said masses having axial end faces; a plurality of friction plates carried by the member in a manner to move with the member and presenting axial end faces for frictional engagement with the axial end faces of said masses; said friction plates and said masses being arranged in alternate relationship so that each of said masses have their end faces in engagement with an end face of a pair of said friction plates; means carried by the member and operably connected to urge the adjacent faces of said friction plates and said masses into frictional engagement; and adjusting means carried by the member and operably connected to effect an adjustment of the degree of frictional engagement between the adjacent faces of said friction plates and said masses, whereby said friction plates will move with the member and said independent masses will move radially relative to the member, each other and said friction plates and by reason of the frictional engagement of the adjacent faces of said friction plates and said independent masses the vibratory energy of the member will be dissipated by the frictional resistance to relative movement between said independent masses and said friction plates.

2. In a vibration dampener for dampening the vibration of a member comprising; a plurality of friction plates presenting end faces carried by the member so that they move in unison with the member, said friction plates being adapted to be axially movable relative to the member; a plurality of independent masses presenting axial end faces carried by the member and being independently radially movable relative to each other and to said friction plates and axially movable relative to the member; said friction plates and said independent masses being disposed in alternate arrangement so that the end faces of each of said independent masses will be in engagement with an end face of a pair of said friction plates; resilient means carried by the member and operably disposed to urge the adjacent faces of said friction plates and said independent masses into frictional engagement; and adjusting means carried by the member and operably connected to adjust the degree of urging that said resilient means will exert upon said friction plates and said independent masses; whereby when the member vibrates said friction plates will move with the member and said independent masses will move radially relative to each other and to said plates and by reason of the frictional engagement of the adjacent faces of said masses and said plates the vibratory energy of the member will be dissipated in overcoming the frictional resistance to relative radial movement between said plates and said independent masses.

3. In a vibration dampener for dampening the vibration of a member having a longitudinal bore; a plurality of independent masses contained within said bore, each of said independent masses presenting a friction surface at both of its ends and being independently movable radially within the longitudinal bore of the member; a plurality of friction plates carried within the bore in snug engagement with the wall of said bore so that they move in unison with the member and presenting friction surfaces on their faces for engagement with the friction surfaces of said independent masses; said friction plates and said independent masses being alternately arranged within the bore in a manner that each of the frictional surfaces of said independent masses is in engagement with a frictional surface of said plates; a resilient element carried within said bore to yieldably urge the frictional surfaces of said plates and said independent masses into frictional engagement; closure means operably connected to said member to close said bore for retaining said friction plates, said independent masses and said resilient element therein; and adjusting means operably connected to regulate the degree of pressure that said resilient means exerts upon said friction plates and said independent masses for controlling the degree of frictional resistance to relative movement between the surfaces of said plates and said independent masses.

4. In a vibration dampener for dampening the vibration of a member having a blind longitudinal bore in one end thereof; a plurality of independent masses contained within said bore, said independent masses being of a size so that they are free to move radially with respect to each other within the bore of the member, each of said independently and radially movable masses presenting axial end faces; a plurality of friction plates carried by the member within the bore thereof in a manner so that said friction plates will move in unison with the member and presenting axial end faces for engagement with the end faces of said independent masses; said friction plates and said independently and radially movable masses being alternately arranged within the bore in a manner that each of said independently and radially movable masses have their end faces in engagement with the end face of a pair of said friction plates; a resilient element carried within the bore and operably connected to act upon said friction plates and said independently and radially movable masses to urge them into frictional engagement; closure means operably connected to said overarm to close the bore thereof to maintain said friction plates, said independently and radially movable masses and said resilient element therein; and adjusting means carried by said closure means and operably connected to regulate the degree of pressure that said resilient means exerts upon said friction plates and said independently and radially movable masses for controlling the degree of frictional resistance to relative movement between the axial end faces of said friction plates and said independently and radially movable masses.

5. In a vibration dampener for damping the vibration of a member having a blind longitudinal bore in one end thereof, a plurality of independent cylindrical masses and independent cylindrical friction plates receivable in alternate relationship within said bore, said independent cylindrical masses having a diameter less than that of said bore to permit independent radial movement thereof within said bore, said independent cylindrical friction plates having a diameter substantially equal to that of said bore to permit only axial movement thereof within said bore, each of said independent masses and said friction plates having axially spaced end faces, a closure for the end of said bore, yieldable means within said bore operable to maintain the adjacent faces of said independent masses and said friction plates in abutting relationship, and manually operable means in said closure for adjusting the pressure of said yieldable means on said independent masses and said friction plates to regulate the degree of friction between their abutting faces whereby the vibratory energy of said member is dissipated by the frictional resistance afforded by the relative radial movement between said independent masses and said friction plates.

6. In a vibration dampener for damping the vibration of a member, as set forth in claim 5, in which the independent cylindrical masses are of graduated weights progressively positioned with the heaviest one adjacent one end of the bore in the member and the lightest one adjacent the opposite end of the bore in the member whereby the initial vibratory energy of the member will effect the independent radial movement of the heaviest mass and increased vibratory energy of the member will successively effect independent radial movement of the lighter masses to effectively dampen the vibration of the member throughout varying degrees of its vibratory energy.

References Cited in the file of this patent

UNITED STATES PATENTS

| | | |
|---|---|---|
| 2,051,954 | Leland | Aug. 25, 1936 |
| 2,412,499 | Ernst et al. | Dec. 10, 1946 |
| 2,591,115 | Austin | Apr. 1, 1952 |
| 2,656,742 | Poole | Oct. 27, 1953 |